(12) United States Patent
Zeira et al.

(10) Patent No.: US 7,613,159 B2
(45) Date of Patent: Nov. 3, 2009

(54) TRANSMISSION POWER LEVEL ESTIMATION

(75) Inventors: Eldad Zeira, Huntington, NY (US); Guodong Zhang, Farmingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 753 days.

(21) Appl. No.: 11/044,092

(22) Filed: Jan. 27, 2005

(65) Prior Publication Data

US 2005/0169226 A1 Aug. 4, 2005

Related U.S. Application Data

(63) Continuation of application No. 09/855,268, filed on May 15, 2001, now Pat. No. 6,850,500.

(51) Int. Cl.
*H04B 7/216* (2006.01)
*H04B 7/00* (2006.01)
(52) U.S. Cl. ........................ 370/342; 455/522
(58) Field of Classification Search ................ 370/335, 370/342, 441, 479; 455/522
See application file for complete search history.

(56) References Cited

U.S. PATENT DOCUMENTS

| 5,551,057 A | * | 8/1996 | Mitra ........................ 455/522 |
|---|---|---|---|
| 5,987,333 A | | 11/1999 | Sole |
| 6,067,446 A | * | 5/2000 | Persson et al. ................ 455/69 |
| 6,175,745 B1 | | 1/2001 | Bringby et al. |
| 6,192,249 B1 | | 2/2001 | Padovani |
| 6,278,701 B1 | * | 8/2001 | Ayyagari et al. ............ 370/335 |
| 6,405,052 B1 | | 6/2002 | Faber |
| 6,498,934 B1 | | 12/2002 | Muller |
| 6,674,791 B2 | * | 1/2004 | Lomp et al. ................ 375/146 |
| 6,714,523 B2 | * | 3/2004 | Zeira et al. ................ 370/320 |
| 6,873,645 B2 | * | 3/2005 | Lomp et al. ................ 375/142 |
| 7,302,232 B2 | * | 11/2007 | Takatori et al. ............ 455/63.4 |

FOREIGN PATENT DOCUMENTS

| EP | 0936753 | 8/1999 |
|---|---|---|
| EP | 1063788 | 12/2000 |
| EP | 1176730 | 1/2002 |
| JP | 11-298954 | 10/1999 |
| JP | 2000-252918 | 9/2000 |
| JP | 2002-503053 | 1/2002 |
| WO | 97/07600 | 2/1997 |
| WO | 99/40689 | 8/1999 |
| WO | 00/38348 | 6/2000 |
| WO | 00/76086 | 6/2000 |
| WO | 00/54437 | 9/2000 |
| WO | 00/76086 | 12/2000 |
| WO | 01/62032 | 8/2001 |

\* cited by examiner

*Primary Examiner*—Ayaz R Sheikh
*Assistant Examiner*—Blanche Wong
(74) *Attorney, Agent, or Firm*—Volpe and Koenig, P.C.

(57) ABSTRACT

A transmission power level of a selected user is estimated in a code division multiple access (CDMA) communication system. An initial estimate of a transmit power level associated with the selected user is determined. A transmit power level of users of the system other than the selected user is provided. Subsequent estimates for the selected user and the other users are estimated using previous transmit power level estimates of the selected user and the other users. The estimating subsequent estimates is repeated with a last repetition's estimated transmit power levels for the selected and other users being the estimated transmit power levels of the selected and other users.

24 Claims, 5 Drawing Sheets

TRANSMISSION POWER LEVEL ESTIMATION

This application is a continuation of U.S. patent application Ser. No. 09/855,268 filed May 15, 2001, which will issue on Feb. 1, 2005 as U.S. Pat. No. 6,805,500.

BACKGROUND

The invention generally relates to wireless communication systems. In particular, the invention relates to estimating transmission power levels in such systems.

FIG. 1 depicts a physical layout of a wireless communication system. The system has a plurality of base stations 20. Each base station 20 communicates with user equipments (UEs) 22 in its operating area or cell 23. Communications transmitted from the base stations 20 to the UEs 22 are referred to as downlink communications and communications transmitted from the UEs 22 to the base stations 20 are referred to as uplink communications.

A network perspective of a wireless communication system is shown in FIG. 2. Each node-B 24 within the system communicates with associated UEs 22 or users. Each node-B 24 has a single site controller (SC) 34 associated with either a single or multiple base stations 20. A group of node-Bs 24 is connected to a radio network controller (RNC) $28_1$. To transfer communications between RNCs 28, an interface between the RNCs (IUR) 26 is utilized. Each RNC 28 is connected to a mobile switching center (MSC) 30 which in turn is connected to the core network 32.

In code division multiple access (CDMA) communication systems, multiple communications can be sent over the same spectrum simultaneously. The multiple communications are distinguished by their codes. In time division duplex communication systems using CDMA (TDD/CDMA), the spectrum is time divided into repeating frames having time slots, such as fifteen time slots. In such systems, communications are sent in selected time slots using selected codes. A physical channel is defined as one code in one time slot. The use of a single code in a single time slot with a spreading factor of sixteen is referred to as a resource unit. Based on the type of service being provided to a user (UE 22) in the system, one or multiple physical channels may be assigned to support the users uplink and downlink communications.

Since multiple communications are simultaneously carried over the same frequency spectrum, one user's communications may interfere with another user's. To reduce such interference, transmission power control is used. In transmission power control, a transmission is sent at a power level so that only a desired reception quality is met, such as a signal to interference ratio (SIR), bit error rate (BER) or block error rate (BLER).

One transmission power control technique is open loop power control. In open loop power control, a transmitter's power level is determined using a pathloss estimate between the transmitter site and its desired receiver site. To estimate the pathloss, the receiver site transmits a signal and an indicator of the transmission power level of the signal. By subtracting the received power level from the transmitted power level of the signal, the pathloss is estimated. Using the pathloss estimate and a target signal to interference ratio (SIR), a transmission power level for the transmitter is set. The value of the target SIR is based on the service type. Another type of power control is closed loop power control. Closed loop power control sends power commands from the receiver site to adjust the transmitter's power level.

When a new user or user service is added to a system, the new user will create interference to existing users communicating at the same time. To maintain their desired signal quality, the existing users typically increase their transmission power levels. However, some transmitters may be near their transmission power limits. As a result, adding the new user may create an unacceptable quality of service (QOS) for existing users.

To evaluate whether a new user should be added to the system, it is desirable to estimate the transmission power levels of the existing users, after admission of the new user. If all of the users, including existing and the new user, are all safely within acceptable transmission power levels, the new user is admitted. If a user's transmission power level is unacceptable, such as by being over its transmission power level capabilities, the new user is not admitted.

Accordingly, it is desirable to have better transmission power estimations.

SUMMARY

A transmission power level of a selected user is estimated in a code division multiple access (CDMA) communication system. An initial estimate of a transmit power level associated with the selected user is determined. A transmit power level of users of the system other than the selected user is provided. Subsequent estimates for the selected user and the other users are estimated using previous transmit power level estimates of the selected user and the other users. The estimating subsequent estimates is repeated with a last repetition's estimated transmit power levels for the selected and other users being the estimated transmit power levels of the selected and other users.

BRIEF DESCRIPTION OF THE DRAWING(S)

DETAILED DESCRIPTION OF THE PREFERRED EMBODIMENT(S)

Figure 1:
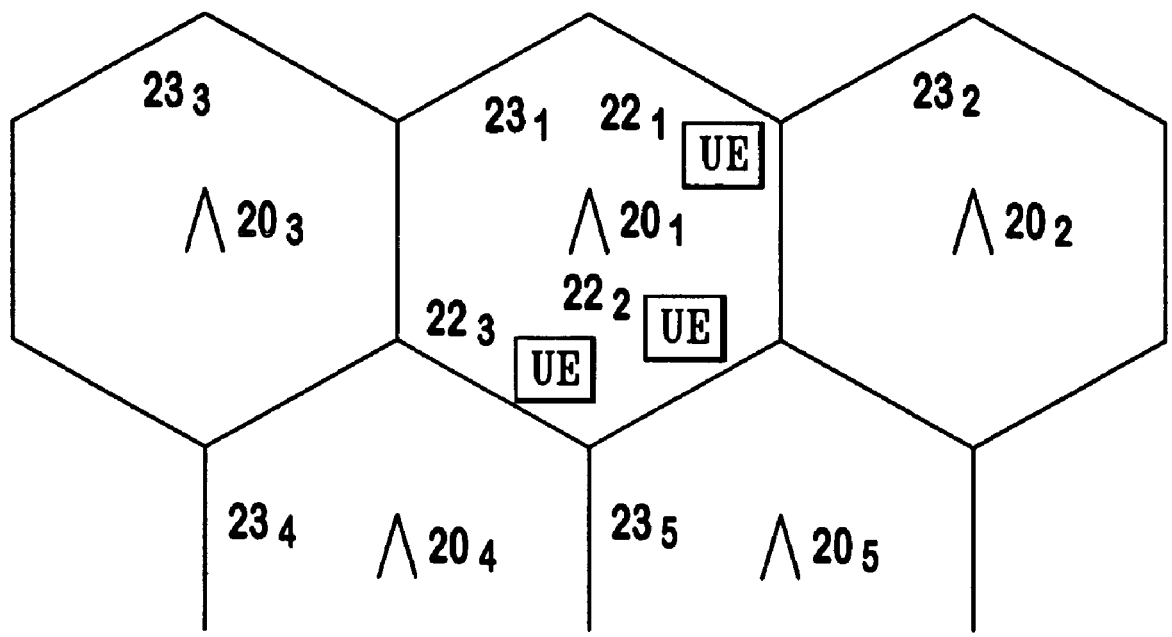
FIG. 1 is an illustration of a physical layout of a wireless communication system.
Figure 2:
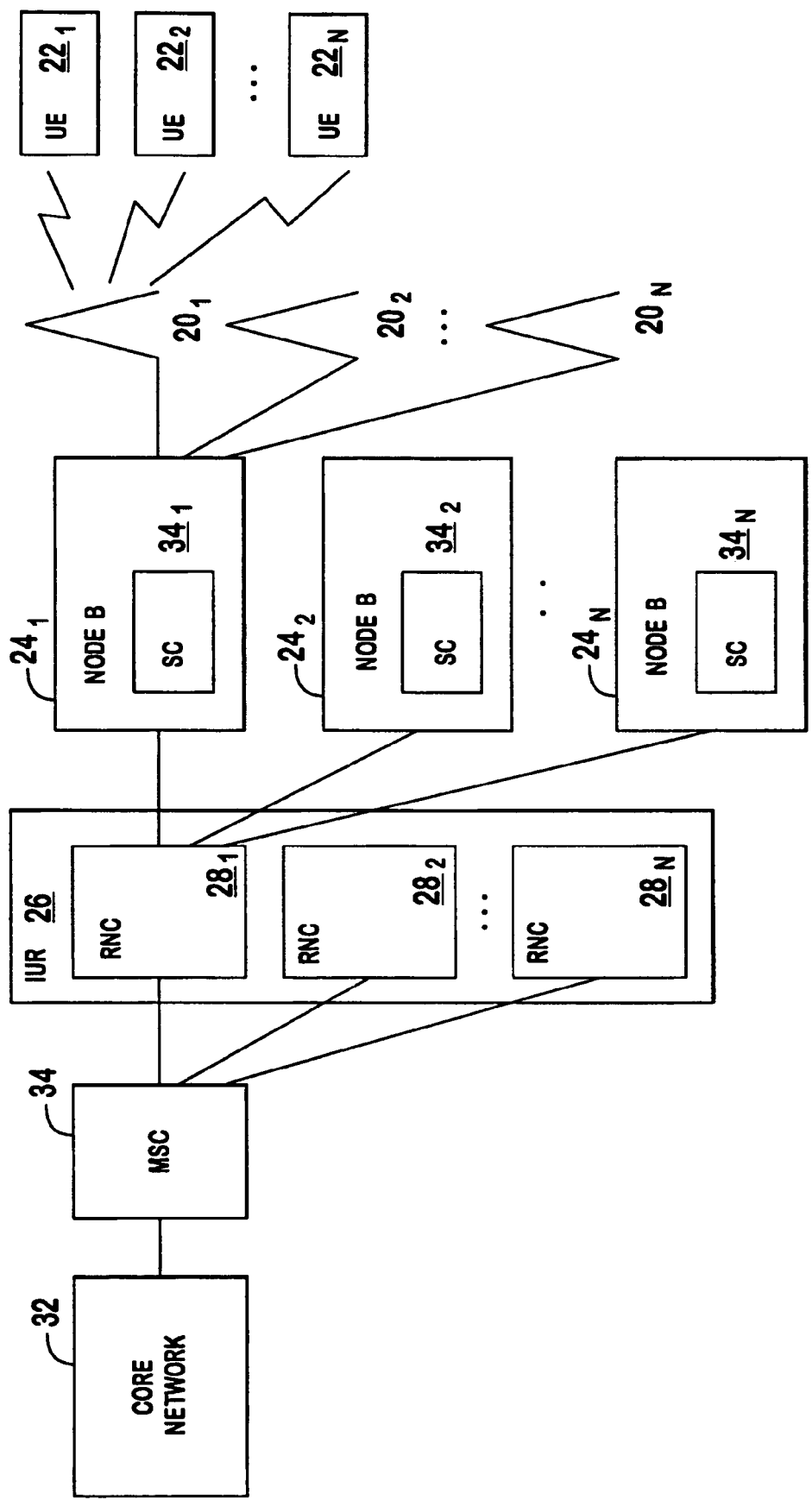
FIG. 2 is an illustration of a network layout of a wireless communication system.
Figure 3:
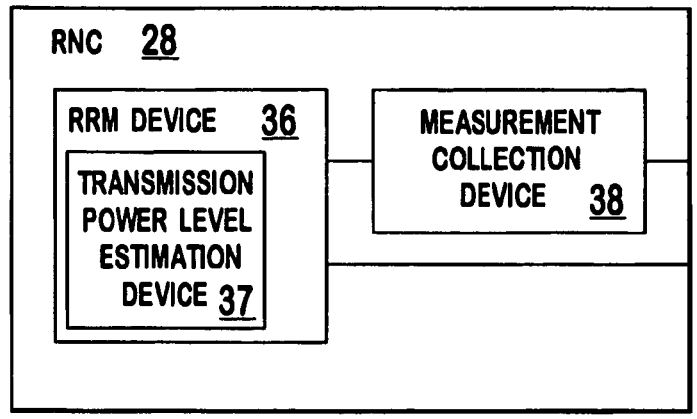
FIG. 3 is a simplified radio network controller for transmission power level estimation.

FIG. 3 is a simplified RNC 28 for use in transmission power level estimation. The RNC 28 has a RRM device 36 and a measurement collection device 38. The measurement collection device 38 collects various measurements from other components of the network, such as the node-Bs 24 and the UEs 22. These measurements include transmission power levels (both uplink and downlink), pathloss information and other information. The RRM device 36 uses the measurements in determining efficient assignment of resources which is sent to the other components. The RRM device has a transmission power level estimation block 37 for use in determining the estimated transmission power levels.

Figures 4, 5:
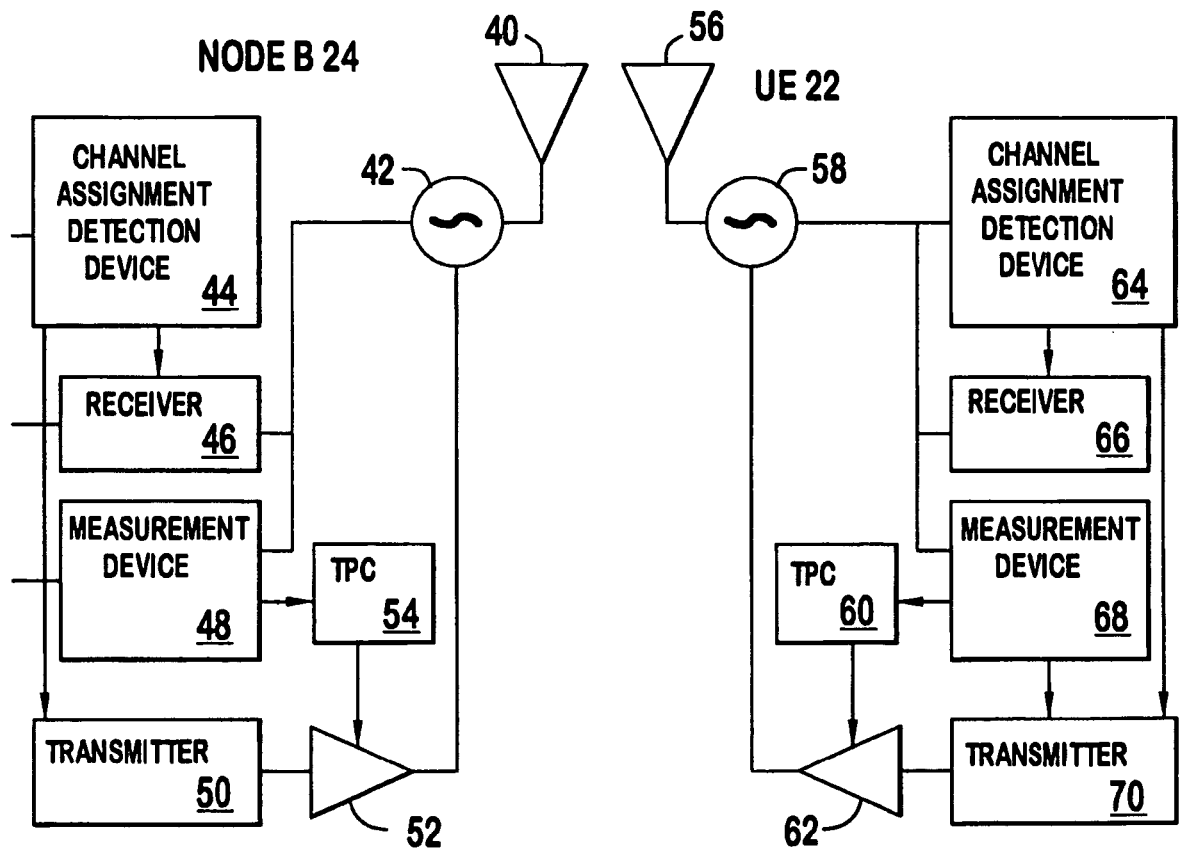
FIG. 4 is a simplified node-B for transmission power level estimation.
FIG. 5 is a simplified user equipment for transmission power level estimation.

FIG. 4 is a simplified node-B 24 for use in transmission power level estimation. An antenna 40 receives radio frequency signals over a radio channel from the UEs 22. The received signals are passed through an isolator or switch 42 to a receiver 46 and a measurement device 48. A channel assignment device 44, which receives channel assignments from the RNC 28, identifies the physical channels and time slots to allow the receiver 46 to detect the transmitted data. The receiver 46 may be a multiuser detection device (MUD), a RAKE or a different type of receiver. The receiver 46 also recovers signaled information from the UE 22, such as measurement information, which is relayed to the RNC 28.

A measurement device 48 takes various measurements at the node-B 24, such as interference levels and reception power levels. These measurements are also relayed to the RNC 28. A transmitter 50 sends data and signaled information, such as channel assignments and a transmission power level of the node-B transmitter 24, to the UEs 22. The channel assignment device 44 determines a transmission power level for the node-B transmitter 50. The channel assignment device 44 controls the gain of an amplifier 52 to control the transmission power level. The transmitted signals pass through the isolator or switch 42 and are radiated by the antenna 40.

FIG. 5 is a simplified UE 22 for use in RRM. An antenna 56 receives radio frequency signals over a radio channel from the node-B 24. The received signals are passed through an isolator or switch 58 to a receiver 66 and a measurement device 68. A channel assignment detection device 44 recovers the signaled information concerning the UE's channel assignments for both uplink and downlink. The receiver 66 may be a multiuser detection device (MUD), a RAKE or a different type of receiver.

A measurement device 68 takes various measurements at the UE 22, such as interference levels and reception power levels. These measurements are also relayed to the RNC 28 by being transmitted to the node-B 24. A transmitter 70 sends data and signaling information, such as measurements, pathloss information and a transmission power level of the UE transmitter 70, to the node-B 24. A transmit power controller (TPC) 60 determines a transmission power level for the node-B transmitter 60. The TPC 60 controls the gain of an amplifier 62 to control the transmission power level. The transmitted signals pass through the isolator or switch 58 and are radiated by the antenna 56.

The following is an approach to estimate new transmit power levels for users in a system after admission of a new user or user service. The system's users use transmission power control, such as open loop power control, to reduce interference between users.

The approach is explained in conjunction with W-CDMA TDD/CDMA system, where uplink and downlink transmissions are assigned separate time slots. The approach is also applicable to CDMA systems where uplink and downlink transmissions are separated by frequency spectrum and other hybrid time division multiple access (TDMA)/CDMA and TDD/CDMA systems where uplink and downlink communications are assigned separate time slots or frequency spectrum, by including the out of band attenuation factor in the pathloss.

Figure 8:
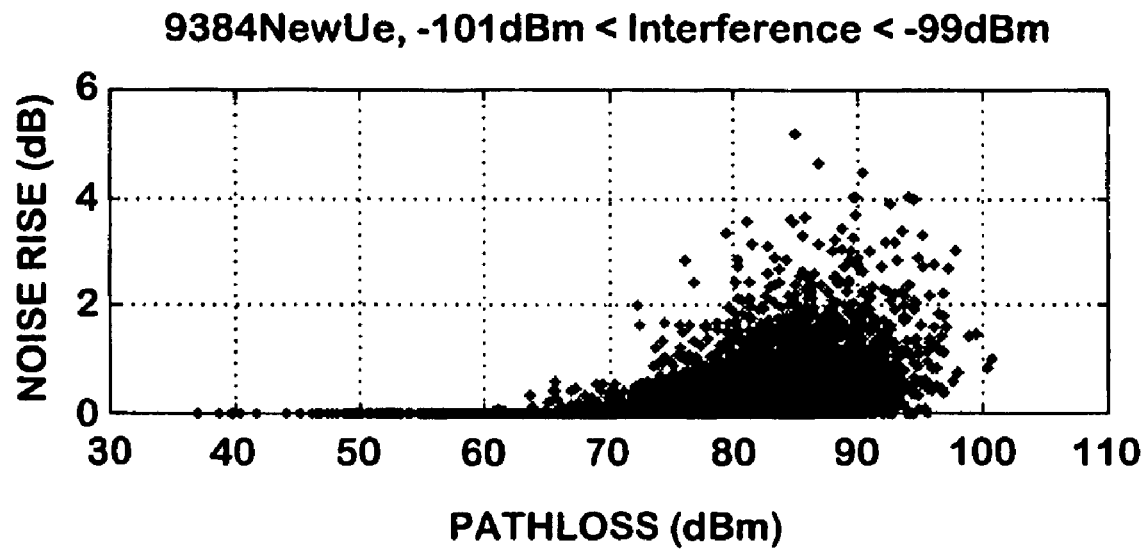
FIG. 8 is a plot of a simulation of noise rise versus pathloss.

For the analysis, the system as shown in FIG. 8 is divided into a region where for a particular time slot, M UEs 22 are served by N base stations 20. To simplify the analysis, it is assumed multi-user detection (MUD) receivers are used for both uplink and downlink reception, although the approach is extendable to other receivers, such as a RAKE receiver. Each base station 20 is assigned an index, such as j, where j=1, 2, ..., N. Each base station j has a set $\Omega(j)$ UEs 22 connected to it. Each UE 22 is assigned an index, such as i, where i=1, 2, ..., M. A new UE 22 or UE session, UE M+1, is to be added to the region. UE M+1 is proposed to be added to base station N.

For use in determining the transmit power levels for an uplink time slot, an $i^{th}$ UE's initial uplink transmit power level prior to the addition of the new user is defined as $T^0(i)$, where 0 indicates the initial transmit power level. The new user's power is determined, such as by Equation 5.

$$T^0(M+1) = PL_{M+1,n} \cdot ISCP_{M+1} \cdot SIR_{UL}(M+1) \qquad \text{Equation 5}$$

$PL_{M+1,n}$ is the pathloss between the M+1 user and the base station. This value is typically determined at the base station n by subtracting a received power level of a signal from the UE 22 from its transmission power level. Alternately, the pathloss is estimated from other UEs 22 at a similar distance from the base station 20. $ISCP_{M+1}$ is the interference as measured using interference signal code power (ISCP) at the UE receiver. This value is either measured at the UE 22 or estimated by ISCP measurements by other similarly situated users. The ISCP can be replaced in the analysis with other types of interference measurements. $SIR_{UL}(M+1)$ is the desired uplink signal to interference ratio at the base station for the M+1 user.

The other users initial transmit powers are typically known or are estimated, $T^0(1), \ldots, T^0(M)$. An initial power vector is constructed (72), such as by Equation 6.

$$T^0 = \begin{bmatrix} T^0(1) \\ T^0(2) \\ \ldots \\ T^0(M) \\ T^0(M+1) \end{bmatrix} \qquad \text{Equation 6}$$

Each users power level is iteratively adjusted to generate an estimate of the transmission power levels that each user will reach at equilibrium after introduction of the new user M+1.

The ISCP for each iteration as seen by user i is based on the transmission power of each user not in user i's cell divided by its estimated pathloss to user i's base station j. It is assumed that there is negligible cross-channel interference within each cell. This ISCP estimate is, preferably, used in an open loop type analysis to determine user i's power level for each iteration. One approach to calculated each $k^{th}$ iteration's power level for user I (74), is per Equation 7.

$$T^K(i) = PL_{i,j} \cdot ISCP^{K-1}(i) \cdot SIR_{UL}(i) \qquad \text{Equation 7}$$

$$= PL_{i,j} \cdot SIR_{UL}(i) \cdot \sum_{h=1, h \notin \Omega(j)}^{M+1} (T^{K-1}(h)/PL_{h,j})$$

If the location of each user is know, the pathloss can be estimated using the user's location. Otherwise, the pathloss is estimated based on a typical expected pathloss between that user's cell and user i's base station adjusted by the pathloss to that user's base station. Alternately, user i's base station i may calculate that user's pathloss.

To facilitate implementation of the iteration analysis, each iteration can be viewed as a vector multiplication, such as per Equation 8.

$$T^K = A \cdot T^{K-1} \qquad \text{Equation 8}$$

A is an (M+1)×(M+1) matrix. In matrix A, an element $A_{kl}$, where k is the row and l is the column and ($1 \leq k, 1 \leq M+1$) is given, such as per Equation 9.

$$A_{kl} = \begin{cases} 0, & \text{where } k \in \Omega(j), l \in \Omega(j) \\ (SIR_{UL}(k) \cdot PL_{k,j})/PL_{l,j}, & \text{where } k \in \Omega(j), l \in \Omega(h), j \neq h \end{cases} \qquad \text{Equation 9}$$

The iterations are continued until the transmission power levels converge (76), such as per Equation 10.

$$\frac{|T^{K+1}(i) - T^K(i)|}{T^K(i)} \leq \delta, \text{ where } 1 \leq i \leq M+1 \qquad \text{Equation 10}$$

δ is a convergence parameter, which is a small number, such as $1 \times 10^{-4}$. Alternately, a limit may be set to the number of iterations.

After convergence is met, each UE's estimated transmission power is checked against its capabilities. If all users have acceptable transmission power levels, the new user or service can be added (78). If some of the users exceed their capabilities or are unacceptably close to their capability limits, the new user or service is not admitted (78).

For the downlink time slots, the initial downlink transmission power levels are used to produce a downlink transmission power vector $T^0$ (72), such as per Equation 11.

$$T^0 = \begin{bmatrix} T^0(1) \\ T^0(2) \\ \cdots \\ T^0(M) \\ T^0(M+1) \end{bmatrix} \qquad \text{Equation 11}$$

The M+1 user is proposed to be admitted to the $N^{th}$ base station. The values for $T^0(i), \ldots T^0(M)$ are known or measured at their respective base stations 20. $T^0(M+1)$ is determined such as per Equation 12.

$$T^0(M+1) = PL_{M+1,n} \cdot ISCP_{M+1} \cdot SIR_{DL}(M+1) \qquad \text{Equation 12}$$

$PL_{M+1,n}$ is the measured pathloss between base station n and user M+1 or the pathloss is estimated based on other users similarly situated. $ISCP_{M+1}$ is the measured ISCP or another interference measure at user M+1, prior to admission. This value may also be estimated based on other users similarly situated. $SIR_{DL}(M+1)$ is the desired received downlink SIR at user M+1.

Each user's downlink power level is iteratively estimated (74), after introduction of the new user M+1. One approach to calculate each $K^{th}$ iteration for an $i^{th}$ user is per Equation 13.

$$T^K(i) = PL_{i,j} \cdot ISCP^{K-1}(i) \cdot SIR_{DL}(i) \qquad \text{Equation 13}$$

$$= PL_{i,j} \cdot SIR_{DL}(i) \cdot$$

$$\sum_{h \in \Omega(L), L=1,2,\ldots,N, L \neq j}^{M+1} (T^{K-1}(h)/PL_{L,j})$$

L represents all other base stations 20 besides base station j of the $i^{th}$ user. To facilitate implementation, determining each iteration, K, can be viewed as a vector multiplication such as per Equation 14.

$$T^K = B \cdot T^{K-1} \qquad \text{Equation 14}$$

$T^K$ is the determined transmission power levels. $T^{K-1}$ is the determined power level of the preceding iteration. B is a (M+1)×(M+1) matrix. For an element at the $r^{th}$ row and $s^{th}$ column of B, such that $1 \leq r, s \leq M+1$), $B_{rs}$ is determined per Equation 15.

$$B_{rs} = \begin{cases} 0, & r \in \Omega(j), s \in \Omega(j) \\ (SIR_{DL}(r) \cdot PL_{r,j})/PL_{r,i} & r \in \Omega(j), s \in \Omega(l), j \neq l \end{cases} \qquad \text{Equation 15}$$

The iterations are continued until the transmission power levels converge (76), such as per Equation 16.

$$\frac{|T^{K+1}(i) - T^K(i)|}{T^K(i)} \leq \delta, \text{ where } 1 \leq i \leq M+1 \qquad \text{Equation 16}$$

δ is a convergence parameter, which is a small number, such as $1 \times 10^{-4}$. The convergence parameter for the downlink may be the same or different than the uplink convergence parameter.

After convergence is met, estimated downlink transmission power is checked against the base station's transmission capabilities. If all transmitters 50 will be within acceptable transmission power levels, the new user can be admitted (78). If some of the transmitters 50 exceed their transmission power level limit or are unacceptably close to the limit, the new user is not admitted (78).

Figure 6:
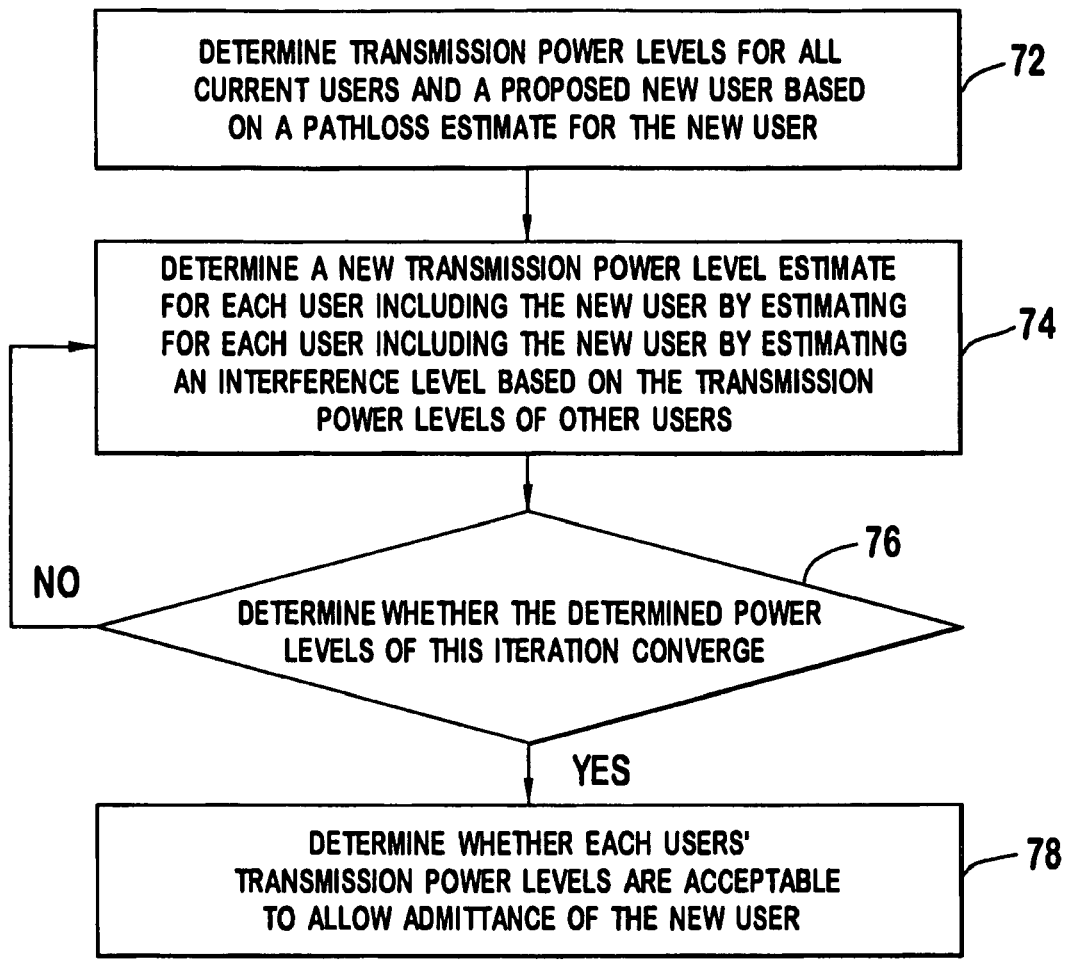
FIG. 6 is a flow chart for determining transmission power levels after admission for a new user or user service.
Figure 7:
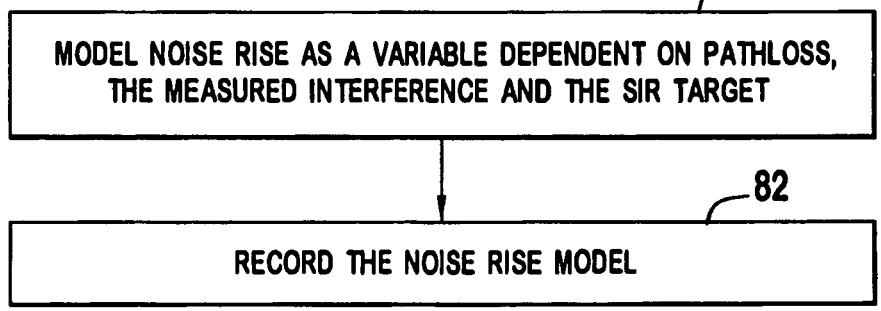
FIG. 7 is a flowchart of determining transmission power levels using noise rise.

In some systems, all of the measurements required for the procedure of FIG. 6 may not be available. One approach to determine the increase in transmission power as a result of a new assignment using noise rise is per FIG. 7. The noise rise as a result of an assignment depends on the pathloss, the measured interference (I), such as measured using ISCP, and the SIR target for the transmitter of interest. As a result, empirically, the noise rise can be estimated.

The noise rise is modeled as a variable depending on the pathloss, the measured interference, and the SIR target. Using either simulation or field data, a noise rise model is developed (80). The data can be collected and updated during the system normal operation. The modeled noise rise may be stored as a table or a mathematical relationship (82), such as a curve or series of curves.

One equation for estimating noise rise is per Equation 17.

$$\text{Noise rise} = \Delta I(I, \text{pathloss}, \text{SIR}_{TARGET}) \quad \text{Equation 17}$$

Figure 9:
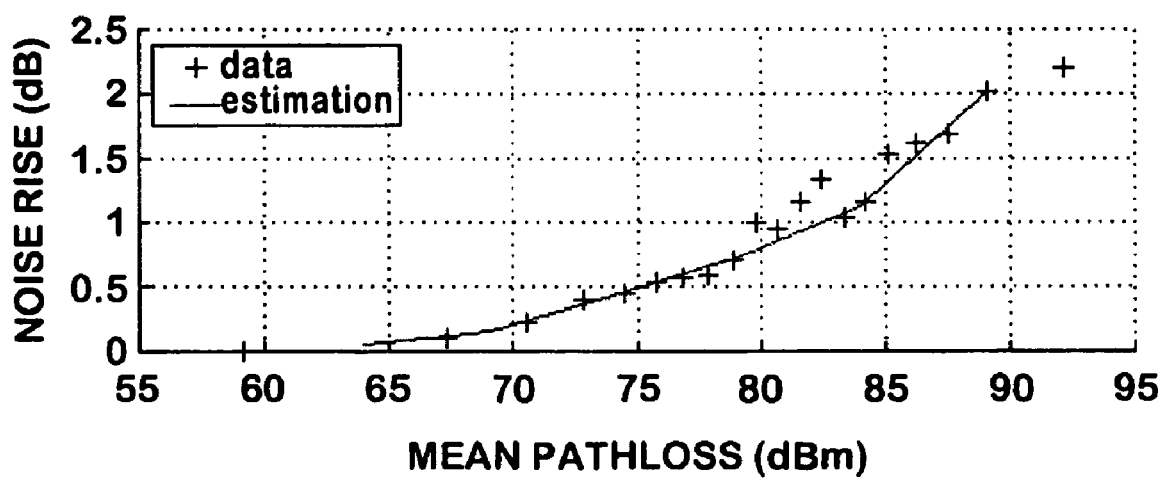
FIG. 9 is a graph of a simulation of noise rise versus mean pathloss.

The noise rise is modeled as a change in the measure interference (I), $\Delta I$. $\Delta I$ is a function of the measured interference, the pathloss and the target SIR. FIGS. 8 and 9 illustrate obtaining a curve fitting the noise rise using simulation results for only the pathloss for simplicity. Data for the noise rise estimation can be obtained, including during the system normal operation, in the following way. Initially, a high fixed margin is used for resource allocation. Before every allocation, the interference level is recorded. After allocation, allowing the power control loops to adjust, the interference is measured again and compared to the before allocation value. The difference is tabulated as a function of the pathloss to the user, the before allocation interference and the required target SIR of the user. After a sufficient number of collections, a smoothing operation is used to create a final table or mathematical relationship, such as a formula.

Alternately, a generic table or mathematical relationship, such as derived from simulations, is used. The generic table or relationship is refined or updated during the normal system operations.

FIG. 8 illustrates the simulated results of noise rise versus the pathloss. FIG. 9 illustrates a curve representing the noise rise versus the mean pathloss. As a result, the noise rise for a transmitter can be estimated from that transmitter's pathloss.

The transmitter power level for a transmitter is determined using the estimated noise rise, such as per Equation 18.

$$\text{Transmit Power} = \quad \text{Equation 18}$$
$$\text{Interference Measure} + \text{Pathloss} + SIR_{TARGET} +$$
$$\text{Noise Rise} + \text{Measurement Error Margin}$$

The Measurement Error Margin is a design parameter used to compensate for measurement errors. The Measurement Error Margin is typically set at a conservatively high value to allow an adequate margin.

Figure 10:
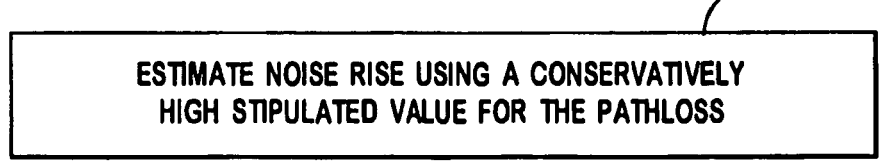
FIG. 10 is a flowchart of compensating for missing pathloss information.

Under certain conditions, information concerning the transmitter's pathloss may not be available, as shown in FIG. 10. Missing pathloss information may result in uplink time slots, where the UE transmission power level is unavailable for the pathloss calculation. To estimate the noise rise in such situations, a conservatively high stipulated value for the pathloss, $\overline{\text{pathloss}}$, is used (84). Using a high stipulated value, effectively overestimates the noise rise. Accordingly, the resulting determined transmission power levels are typically overstated. The noise rise is determined using Equation 19.

$$\text{Noise Rise} = \Delta I(I, \overline{\text{pathloss}}, \text{SIR}_{TARGET}) \quad \text{Equation 19}$$

The stipulated value for the $\overline{\text{pathloss}}$ may be a set value or a cell dependent parameter based on cell range and propagation conditions.

What is claimed is:

1. A method for determining transmission power levels after admission of a new user in code division multiple access (CDMA) communications, the method comprising:
   determining an initial estimate of a first transmit power level by a radio network controller (RNC), wherein the first transmit power level is associated with the new user;
   providing estimates of a second transmit power level by the RNC, wherein the second transmit power level is associated with each of the existing users;
   generating subsequent estimates for the first transmit power level and the second transmit power level using previous estimates of the first transmit power level and the second transmit power level; and
   repeatedly generating subsequent estimates with a last repetition's estimates for the first transmit power level and the second transmit power level, the subsequent estimates being generated until the estimated first transmit power level and the estimated second transmit power level converge, wherein convergence of the estimated transmit power levels is determined by the equation $$\frac{|T^{K+1}(i) - T^{K}(i)|}{T^{K}(i)} \le \delta$$

wherein T is the transmit power level, i is an index for each user between 1 and M+1, M is a number of existing users, M+1 identifies the new user, K is a number of estimations of the transmit power level for user i, and $\delta$ is a convergence parameter.

2. The method of claim 1 wherein the initial estimate of the first transmit power level is determined using an estimated pathloss between the new user and a base station of the new user, an interference estimate and a desired signal to interference ratio.

3. The method of claim 2 wherein the interference estimate is a measure of interference signal code power of the new user.

4. The method of claim 2 wherein the interference estimate is a measure of interference signal code power of users located a similar distance from the base station as the new user.

5. The method of claim 2 wherein the estimated pathloss is a difference between a received power level and the first transmit power level.

6. The method of claim 2 wherein the estimated pathloss is determined by a pathloss of users located a similar distance from the base station as the new user.

7. The method of claim 1 wherein the generating subsequent estimates includes using an estimated pathloss between users of cells other than a cell of the new user and the base station of the new user, an interference estimate and a desired signal to interference ratio.

8. The method of claim 7 wherein the interference estimate is determined by summing a transmit power level of users of cells other than a cell of the new user divided by a pathloss between the other cell user and the other cell user's base station.

9. A radio network controller (RNC) for determining transmission power levels after admission of a new user in code division multiple access (CDMA) communications, the RNC comprising:
   a determining device configured to determine an initial estimate of a first transmit power level, wherein the first transmit power level is associated with the new user;

a providing device configured to provide estimates of a second transmit power level, wherein the second transmit power level is associated with each of the existing users;

an estimating device configured to generate subsequent estimates for the first transmit power level and the second transmit power level using previous estimates of the first transmit power level and the second transmit power level; and said estimating device further configured to repeatedly generate subsequent estimates with a last repetition's estimates for the first transmit power level and the second transmit power level, the subsequent estimates being generated until the estimated first transmit power level and the estimated second transmit power level converge, wherein convergence of the estimated transmit power levels is determined by the equation $$\frac{|T^{K+1}(i) - T^K(i)|}{T^K(i)} \le \delta$$

wherein T is the transmit power level, i is an index for each user between 1 and M+1, M is a number of existing users, M+1 identifies the new user, K is a number of estimations of the transmit power level for user i, and δ is a convergence parameter.

10. The RNC of claim 9 wherein the initial estimate of the first transmit power level is determined using an estimated pathloss between the new user and a base station of the new user, an interference estimate and a desired signal to interference ratio.

11. The RNC of claim 10 wherein the interference estimate is a measure of interference signal code power of the new user.

12. The RNC of claim 10 wherein the interference estimate is a measure of interference signal code power of users located a similar distance from the base station as the new user.

13. The RNC of claim 10 wherein the estimated pathloss is a difference between a received power level and the first transmit power level.

14. The RNC of claim 9 wherein the estimated pathloss is determined by a pathloss of users located a similar distance from the base station as the new user.

15. The RNC of claim 9 wherein said estimating device is configured to use an estimated pathloss between users of cells other than a cell of the new user and the base station of the new user, an interference estimate and a desired signal to interference ratio.

16. The RNC of claim 15 wherein the interference estimate is determined by summing a transmit power level of users of cells other than a cell of the new user divided by a pathloss between the other cell user and the other cell user's base station.

17. A radio network controller (RNC) for determining transmission power levels after admission of a new user in code division multiple access (CDMA) communications, the RNC comprising:

a radio resource management device configured to:
determine an initial estimate of a first transmit power level, wherein the first transmit power level is associated with the new user;
provide estimates of a second transmit power level, wherein the second transmit power level is associated with each of the existing users;
generate subsequent estimates for the first transmit power level and the second transmit power level using previous estimates of the first transmit power level and the second transmit power level; and
repeatedly generate subsequent estimates with a last repetition's estimates for the first transmit power level and the second transmit power level, the subsequent estimates being generated until the estimated first transmit power level and the estimated second transmit power level converge, wherein convergence of the estimated transmit power levels is determined by the equation $$\frac{|T^{K+1}(i) - T^K(i)|}{T^K(i)} \le \delta$$

wherein T is the transmit power level, i is an index for each user between 1 and M+1, M is a number of existing users, M+1 identifies the new user, K is a number of estimations of the transmit power level for user i, and δ is a convergence parameter.

18. The RNC of claim 17 wherein the initial estimate of the first transmit power level is determined using an estimated pathloss between the new user and a base station of the new user, an interference estimate and a desired signal to interference ratio.

19. The RNC of claim 18 wherein the interference estimate is a measure of interference signal code power of the new user.

20. The RNC of claim 18 wherein the interference estimate is a measure of interference signal code power of users located a similar distance from the base station as the new user.

21. The RNC of claim 18 wherein the estimated pathloss is a difference between a received power level and the first transmit power level.

22. The RNC of claim 18 wherein the estimated pathloss is determined by a pathloss of users located a similar distance from the base station as the new user.

23. The RNC of claim 17 wherein the generating subsequent estimates includes using an estimated pathloss between users of cells other than a cell of the new user and the base station of the new user, an interference estimate and a desired signal to interference ratio.

24. The RNC of claim 23 wherein the interference estimate is determined by summing a transmit power level of users of cells other than a cell of the new user divided by a pathloss between the other cell user and the other cell user's base station.

* * * * *

UNITED STATES PATENT AND TRADEMARK OFFICE
CERTIFICATE OF CORRECTION

PATENT NO. : 7,613,159 B2  Page 1 of 1
APPLICATION NO. : 11/044092
DATED : November 3, 2009
INVENTOR(S) : Zeira et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this

Nineteenth Day of October, 2010

David J. Kappos
*Director of the United States Patent and Trademark Office*